I. WEINRICH.
FASTENING DEVICE.
APPLICATION FILED SEPT. 23, 1921.

1,413,082. Patented Apr. 18, 1922.

Inventor
Isidore Weinrich
By his Attorney, Maurice Bloch

UNITED STATES PATENT OFFICE.

ISIDORE WEINRICH, OF BROOKLYN, NEW YORK.

FASTENING DEVICE.

1,413,082.  Specification of Letters Patent.   Patented Apr. 18, 1922.

Application filed September 23, 1921. Serial No. 502,595.

*To all whom it may concern:*

Be it known that I, ISIDORE WEINRCH, a resident of Brooklyn, Kings County, State of New York, and a citizen of Russia, have invented certain new and useful Improvements in Fastening Devices, of which the following is a specification.

This invention relates to improvements in fastening devices such as are used in lieu of buttons for fastening gloves or other articles of wear. My improved fastener can be used in any case to secure two members together. One of the objects of the invention is to provide an inexpensive fastener that cannot be pulled apart after having been connected. To connect the parts of my fastener together or to separate same, a rotary movement upon the part of one of the elements is necessary; hence the fastener members cannot be connected by pressure alone or separated by pulling.

I will now proceed to describe my invention in detail, reference being had to the accompanying drawing, wherein:—

Figure 1:
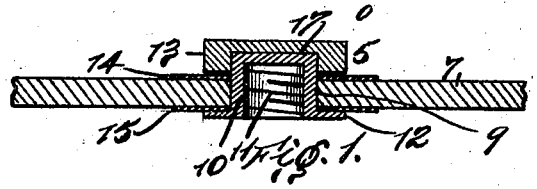
Fig. 1 is a sectional view of one member of my fastener, illustrated as attached to one of a pair of elements to be secured together, said element being also shown in section.
Figure 2:
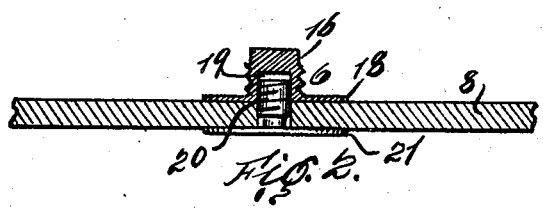
Fig. 2 is a similar view of the other member of the fastener.
Figure 3:
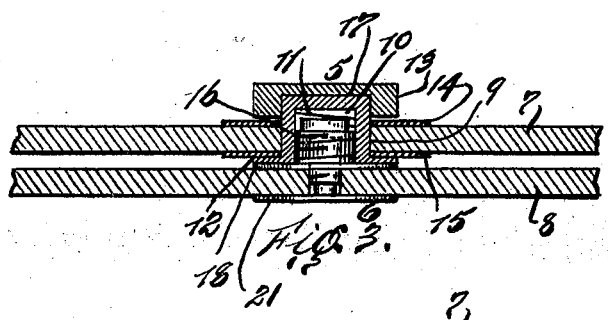
Fig. 3 is a sectional view illustrating the fastener members connected.
Figure 4:
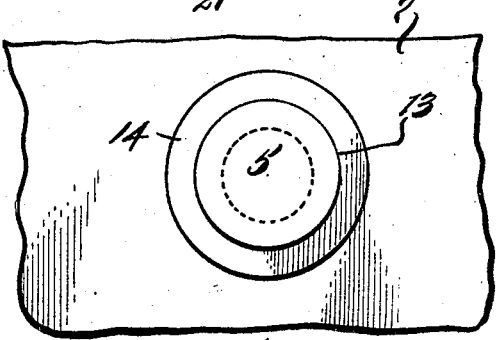
Fig. 4 is a plan view of the member illustrated in Fig. 1.

My improved fastener is made up of two cooperating members arranged to engage one with the other, one member being indicated generally by 5 in Fig. 1, and the other by 6 in Fig. 2. Both member 5 and member 6 will be secured, preferably permanently secured, to their respective elements, indicated by 7 and 8. The elements 7 and 8 may be any two parts which are to be fastened together, such for instance as the flaps of a glove, ends of a belt, or any other two elements requiring securement one to the other. The fastener member 5 is made up of a socketed thimble 9, the socket being indicated by 10 and is threaded as at 11, said thimble carrying an annular flange 12. The thimble 9 will be passed through its element 7 and will engage a head member 13. Both the flange 12 and head 13 will bear upon washers, said washers being indicated by 14 and 15. The member 5 will not be rigidly secured to its elements 7, but will be rotatable so that the threaded socket 11 can be caused to engage the correspondingly threaded stud 16 of the fastener member 6. The elements 9 and 13, which go to make up fastener member 5, will be pressed together, the socketed thimble 9 having a tight fit with the bore 17 of the head 13. To assemble the fastener member 5, the thimble 9 will be passed through an opening formed in its element 7, the washer 15 having been applied to the thimble, after which the head 13 will be pressed onto the thimble causing the head and thimble to be securely connected. The head will not be forced against its washer; hence, the said member 5, as a whole, can be rotated by turning head 13. The fastener member 6 consists of the hereinbefore referred to threaded stud 16, which is carried by a plate 18, said stud having a threaded socket 19 to be engaged by a threaded nipple 20, carried by a plate 21. The nipple 20 will be passed through the element 8 and caused to engage the threaded socket 19 in the stud 16. The element 8 being clamped between the plates 18 and 21, the nipple 20 will be screwed home; hence, the fastener member 6, as a whole, will be securely fastened to its member 8, and will not rotate. To connect elements 7 and 8, it is but necessary to cause stud 16 to engage socket 11, after which member 5 will be rotated until stud 16 is drawn well into said socket or until plate 18 and flange 12 are drawn firmly one against the other, as indicated in Fig. 4. In order to disengage members 5 and 6, it is necessary to rotate member 5 in the proper direction.

It will be obvious that members 5 and 6 cannot be pulled apart as can the ordinary snap fastener. My improved fastener is not subject to as much wear as are snap fasteners, which, after continued use, fail to catch. The parts of my improved fastener will last indefinitely.

Having described my invention, what I claim and desire to secure by Letters Patent is:—

1. A fastening device, a fastener member comprising a thimble having a threaded socket, an annular flange carried by the thimble, a head carried by the thimble but spaced from said flange sufficiently for the interposition of an element to be fastened and for the rotation of said fastening member as a whole when applied to the said element, in combination with a threaded stud having threads exteriorly and interiorly thereof, the exterior threads being arranged to engage the threads in the fastener member first named, and means engaging the threads in the socket of said stud to secure the last named fastener member to an element to be fastened to the element carrying the fastener member first named.

2. A fastening device, a fastener member comprising a thimble having a threaded socket, an annular flange carried by the thimble, a head carried by the thimble but spaced from said flange sufficiently for the interposition of an element to be fastened and for the rotation of said fastener member as a whole when applied to the said element, in combination with a threaded stud having threads exteriorly and interiorly thereof, the exterior threads being arranged to engage the threads in the fastener member first named, a plate carried thereby, a threaded nipple to engage the threads in the socket of the stud, and a plate carried by the nipple, the element to be secured to the element carrying the fastener member first named, being clamped between the plates on said stud and said nipple.

In testimony whereof I hereunto affix my signature.

ISIDORE WEINRICH.